United States Patent [19]
Lundman

[11] 3,873,064
[45] Mar. 25, 1975

[54] VEHICLE RAMP

[75] Inventor: Philip L. Lundman, Milwaukee, Wis.

[73] Assignee: Petersen Industries, Inc., Fredonia, Wis.

[22] Filed: Jan. 14, 1974

[21] Appl. No.: 433,240

[52] U.S. Cl. ................................................ 254/88
[51] Int. Cl. .............................................. E02c 3/00
[58] Field of Search ...... 254/88; 248/165, 188, 352; 197/41

[56] References Cited
UNITED STATES PATENTS

| | | | |
|---|---|---|---|
| 1,871,129 | 8/1932 | Pierce | 254/88 |
| 2,232,585 | 2/1941 | Aldrich | 254/88 |
| 3,386,703 | 6/1968 | Thumma | 254/88 |
| 3,606,253 | 9/1971 | Wooten et al. | 254/88 |
| 3,638,910 | 4/1972 | Nellis | 254/88 |

Primary Examiner—Othell M. Simpson
Attorney, Agent, or Firm—Andrus, Sceales, Starke & Sawall

[57] ABSTRACT

A vehicle ramp including a supporting stand section having a generally horizontal supporting surface to support a wheel of a vehicle, and an inclined ramp section which is removably connected to the supporting section. To prevent accidental tilting of the stand section with respect to the inclined ramp section during certain conditions of vehicle movement on the inclined ramp, a connecting rod is attached between the two sections. One end of the rod is connected for pivotal movement within an opening in the ramp section, while the opposite end of the rod is provided with an enlarged head which is received within a keyhole-shaped opening in the stand section. The stand section and the ramp section are fabricated from interlocking stampings and can be readily assembled and disassembled by the user.

10 Claims, 4 Drawing Figures

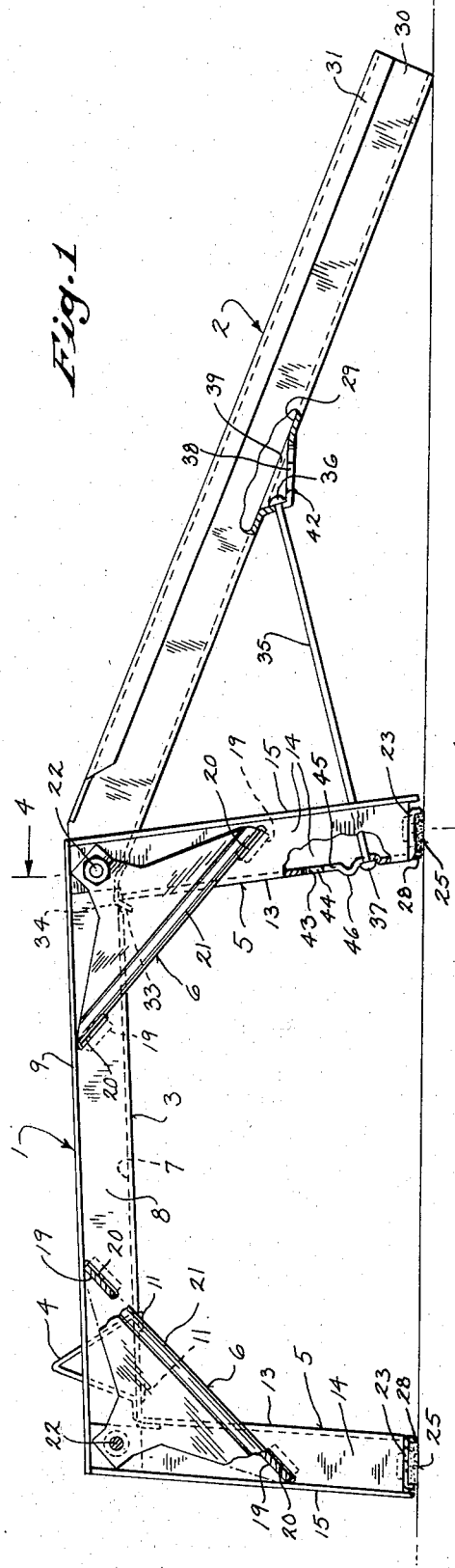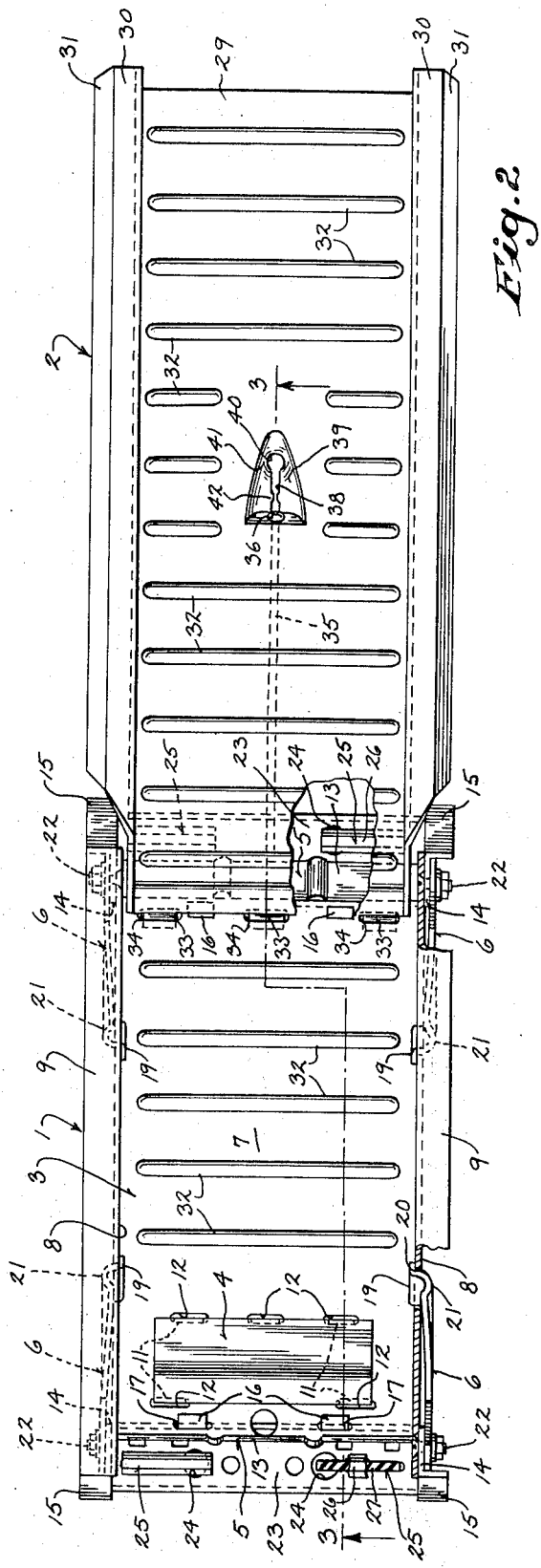

VEHICLE RAMP

BACKGROUND OF THE INVENTION

Vehicle ramps are generally utilized by the homeowner or small garages where hydraulic lifts are not available for the repair or maintenance of vehicles. The conventional vehicle ramp includes a main supporting stand, having a generally horizontal supporting surface to support the wheel of the vehicle, and an inclined ramp is connected to the supporting section. As the vehicle ramp is primarily used at the home, it is important that it can be readily assembled and disassembled after use so it can be stored in a minimum of space. In some instances in the past, the ramp section has been readily separable from the supporting stand, but the supporting stand, which is generally box-like in shape, is normally a weldment and cannot be disassembled.

It has been found that when the front wheels of a vehicle are descending on the inclined ramp section and the vehicle is braked, there is a tendency for the supporting stand to tilt upwardly with respect to the inclined ramp section. This tilting action can cause the stand to hit the bumper of the vehicle which can cause damage to either the bumper or the stand.

Tilting of the stand can also occur in the event the vehicle is driven up the inclined ramp section rearwardly, with rapid rear wheel acceleration.

In the past, to prevent this tilting action, braces have been connected between the inclined ramp section and the stand. However, the braces as used in the past not only have increased the cost of the unit, but have increased the time for assembling and disassembling of the vehicle ramp.

SUMMARY OF THE INVENTION

The invention relates to an improved vehicle ramp which includes a connecting structure that prevents tilting between the inclined ramp section and the supporting stand and yet can be readily assembled and disassembled by the user. The vehicle ramp includes a main supporting section or stand, having a generally horizontal supporting surface adapted to support the wheel of a vehicle. An inclined ramp section is removably connected to the supporting section and a connecting rod is employed to prevent tilting movement between the sections.

One end of the rod is connected for pivotal movement with an opening in the inclined section, while the opposite end of the rod is formed with an enlarged head which is received within a key-hole shaped opening in the supporting stand. With the enlarged head connected within the keyhole-shaped opening, a rigid bracing structure is provided between the inclined section and the supporting stand to prevent tilting movement of the stand with respect to the inclined ramp section.

As an additional feature of the invention, the supporting stand is fabricated from a series of stampings so that the stand can be readily assembled and disassembled by the user. After assembly of the stand, the inclined ramp section is simply connected to the stand by inserting tabs on the inclined section into corresponding slots in the stand. Following the attachment of the inclined section to thhe stand, the connectingg rod can be attached to complete the assembly.

The vehicle ramp of the invention provides a rigid support for the vehicle wheel and eliminates the possibility of the supporting section or stand tilting with respect to the inclined section as the vehicle moves up the incline.

The connecting rod, which serves to connect the inclined section with the stand, can be readily assembled and disassembled, and as the rod is permanently attached to the inclined section, it cannot be lost or misplaced during storage. Furthermore, the the rod, by its connection to the inclined section, permits it to be folded tight against the inclined section for storage.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the assembled vehicle ramp;

FIG. 2 is a plan view of the ramp shown in FIG. 1 with parts broken away and sectioned to show detail of construction;

DESCRIPTION OF THE PREFERRED EMBODIMENT

Figure 3:
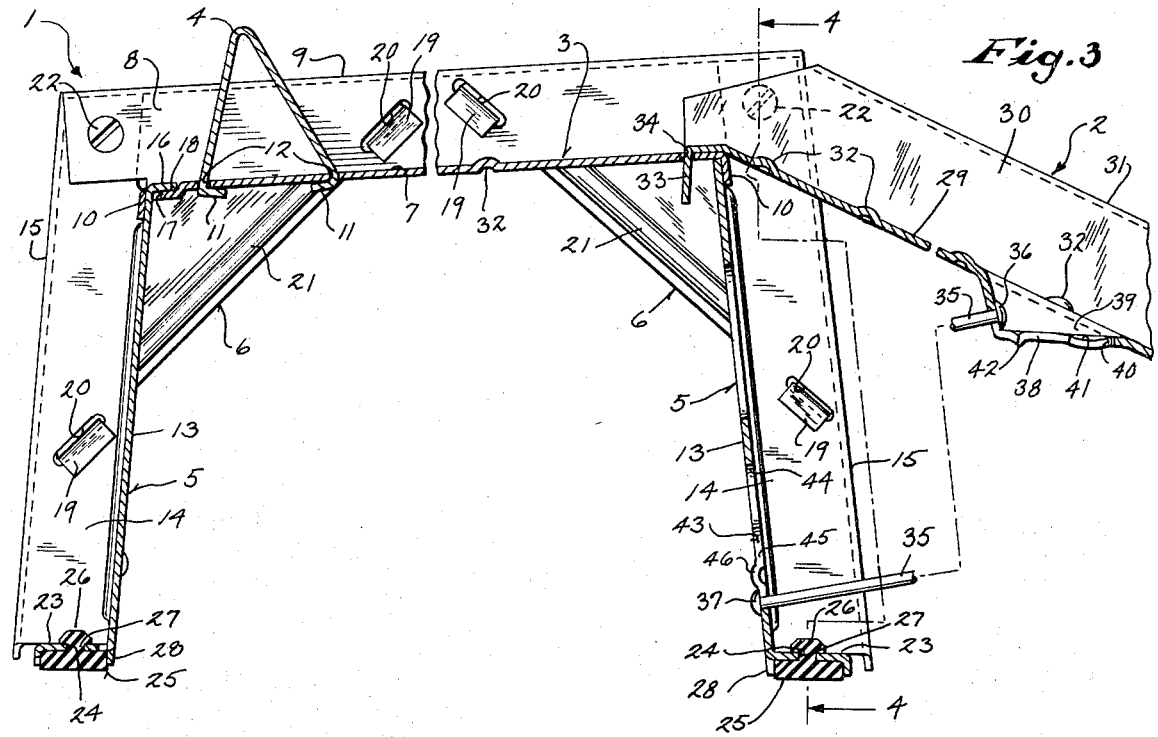
FIG. 3 is a view taken generally along line 3—3 of FIG. 2.
Figure 4:
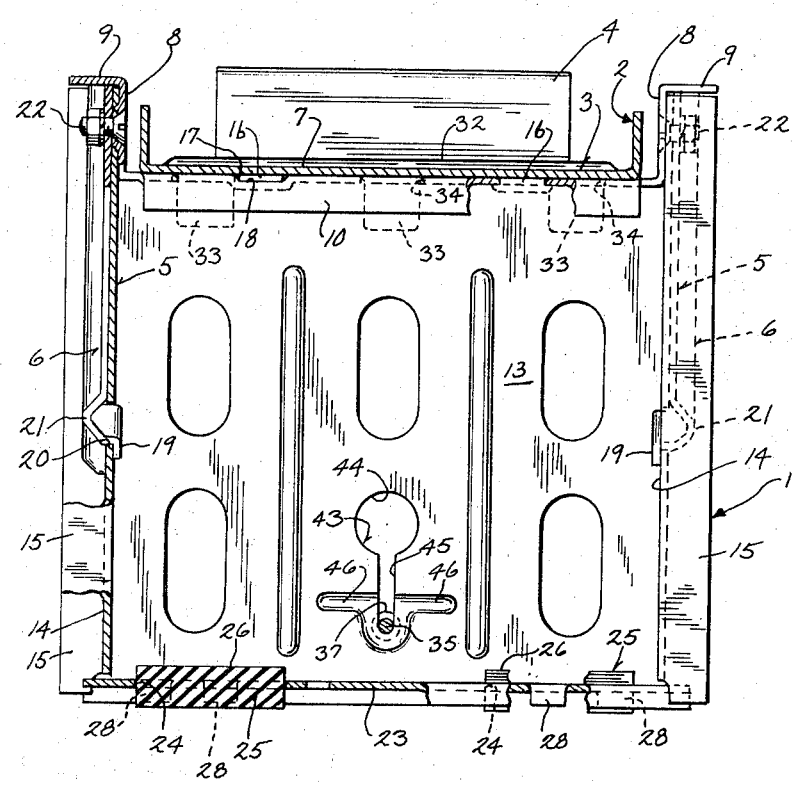
FIG. 4 is a view taken generally along line 4—4 of FIG. 3.

The drawings illustrate a vehicle ramp adapted to support the wheel of a vehicle and composed of a support section 1 or stand and a connecting inclined ramp section 2.

The supporting section or stand 1 includes a generally horizontal supporting member 3 and a stop 4 is located at one end of the support member 3 to provide a stop for the vehicle wheel. The stand 1 also includes a pair of legs 5 which are connected to the ends of the support member 3 and generally triangular braces 6 serve to connect the legs 5 and the support member 3 at the corners of the stand 1.

The upper support member 3 of stand 1 includes a generally flat surface 7 and side edges 8 extend upwardly from the sides of the surface 7 and terminate in outwardly extending flanges 9. In addition, downwardly extending flanges 10 are connected to the opposite ends of the surface 7.

As best shown in FIGS. 2 and 3, the stop 4 is generally triangular in shape and the lower edges of the stop are provided with a series of tabs 11 which extend through slots 12 formed in surface 7 of the upper support member 3. By bending the tabs 11 against the underside of the surface 7,, the stop is firmly held to the upper support member 3.

Each of the legs 5 is composed of a generally flat surface 13 and side edges 14 extend outwardly from the sides of the surface 13 and terminate in outwardly extending flanges 15. To connect the legs 5 to the support member 3, a series of tabs 16 are provided on the surface 13 and the tabs are adapted to be engaged within slots 17. The slots 17 are located adjacent the end flanges 10, and when the tabs 16 are inserted within the slots 17, the upper end of the surface 13 of each leg bears against the end flange 10.

The surface 7 of support member 3 is provided with depressions 18 adjacent each slot 17 and when the legs 5 are assembled, the tabs 16 are received within the depressions 18 so that the tabs do not protrude to any extent above the level of the surface 7.

To connect the braces 6 to the upper support member 3 and legs 5, each brace is provided with a pair of tabs 19 which are received within diagonal slits 20 formed in the side edges 8 and 14 of the upper support member and legs, respectively. Additional rigidity is given to the braces 6 by means of a stiffening rib 21 which extends along the edge of the brace 6 between the tabs 19.

When in the assembled position, the side edges 8 of the upper support member 3, the side edges 14 or the legs and the braces 6 are provided with aligned openings through which bolts 22 are inserted to tie the three members together.

Each leg 5 is also provided with a base flange 23 and the base flange is formed with a pair of keyhole-shaped openings 24. Resilient or rubber-like pads or feet 25 are adapted to be connected to the base flange 23 and provide a non-slip support for the stand 1. As best shown in FIG. 3, each pad 25 is formed with a generally T-shaped cross section, having a ridge 26 which is connected to the main body of the pad by a neck 27 of reduced thickness. To install the pads, one end of the ridge 26 is inserted within the enlarged end of the keyhole-shaped opening 24 and the pad is then slid laterally outward so that the neck portion 27 of the pad is received within the slot of the keyhole-shaped opening to retain the pad with respect to the base flange 23.

Tabs 28 project downwardly from the base flange 23 and serve to prevent the pads from being displaced from the openings 24 during use.

To assemble the stand 1, the tabs 11 on the stop 4 are inserted into the slits 12 and bent against the underside of the surface 7 to lock the stop to the upper support member 3.

One of the legs 5 is then positioned with the surface 13 against the underside of the surface 7 and the tabs 16 are inserted within the slots 17. The leg is then pivoted with respect to the upper support member 3 until the leg is at an approximate 90° position with respect to the upper member 3. The second leg is similarly assembled with respect to the upper support member 3.

After attachment of the legs 5, the tabs 19 of the corner brackets 6 are inserted within the respective slits 20 and the holes in the braces 6 are then aligned with the holes in the side edges 8 and 14 and the bolts 22 inserted through the aligned openings to complete the assembly of the stand 1.

The ramp 2 includes a base surface 29 having a pair of side edges 30 which terminate in outwardly extending flanges 31. Both the base 29 of the ramp and the surface 7 of the stand 1 can be provided with a series of ribs 32 or surface deviations to increase the traction with the tire of the vehicle.

The ramp 2 is assembled with respect to the stand 1 by inserting a series of tabs 33 on the ramp into slits 34 formed in the end of the surface 7 of the stand.

In the past it has been found that under certain conditions the stand 1 may pivot with respect to the ramp 2. For example, if the brakes are applied when the front wheels are moved downwardly on the inclined ramp 2, there may be a tendency for the stand 1 to tilt upwardly with respect to thee ramp. Under these conditions the stand can hit the front bumper of the vehicle, thereby either possibly denting the bumper or causing damage to the stand 1. Similarly, acceleration of the rear wheels as they are moving up the ramp 2 can cause tilting of the stand 1 to bring the stand into contact with the rear bumper of the vehicle.

In accordance with the invention tilting of the stand 1 with respect to the ramp 2 is prevented by means of a rod 35 which is connected between the base 29 of the ramp and the surface 13 of the leg 5. As best illustrated in FIG. 1, the ends of the rod 35 are provided with enlarged heads 36 and 37. One end of the rod 35 is received within a slot 38 located within a generally triangular well or depression 39 in the surface 29 of ramp 2. The slot 38 is provided with an enlargement 40, and curved recesses 41 are formed in the surface 29 bordering the enlarged end 40 of the slot.

To assemble the rod 35 with respect to the inclined ramp 2, the head 36 of rod 35 is inserted through the enlarged end 40 of the slot 38, and the rod is then moved downwardly into the narrow portion of the slot 38. The central portion of the slot 38 is then crimped, as indicated at 42, to retain the rod within the narrow end of the slot 38. This construction provides a pivotal connection between the rod 35 and the ramp 2 and yet the head 36 of the rod is located within the well or depression 39 where it will not be contacted by the tire of the vehicle wheel as the tire moves up the inclined surface 29.

The opposite end of the rod 35 is received within a keyhole-shaped slot 43 formed in the surface 13 of the leg 5. The slot 43 includes an enlarged, generally circular opening 44 and a narrow, connecting groove 45. The opening 44 has a diameter sufficiently large to receive the head 37 of the rod 35 and the rod is then dropped downwardly within the groove 45 so that the head 37 will be trapped behind the surface 13. To retain the connection of the rod 35 to the leg, ribs 46 extend inwardly from the surface 13 on either side of the groove 45. When assembled, the edge of the head 37 will engage the ribs 46 to prevent the rod from being moved upwardly within the slot 43.

The connecting rod 35 provides an inexpensive bracing mechanism which prevents tilting of the stand 1 with respect to the ramp 2. As only a single bracing element is required, a reduction of cost is achieved over conventional units which require a series of bracing members.

The rod 35 can be readily assembled and disassembled after use. As the rod is permanently attached to the ramp 2,, it will not be lost or displaced during storage. Due to the connection of the rod 35 to the surface 29, the rod can be folded tightly against the surface 29 to minimize the storage volume required.

The construction of the invention enables the stand 1 to be readily disassembled after use so that it can be stored in a minimum space. With the exception of the bolts 22 the components of the stand 1 can be simply connected through use of the tab and slit arrangement.

Various modes of carrying out the invention are contemplated as being within the scope of the following claims particularly pointing out and distinctly claiming the subject matter which is regarded as the invention.

I claim:

1. A vehicle ramp, comprising a supporting stand section, an inclined section connected to an end of said supporting stand section, a connecting member connecting the supporting stand section and the inclined section, pivotal means for pivotally connecting a first end of said connecting member to one of said sections, an enlarged head on the second end of said connecting member, the other of said sections having a generally keyhole-shaped slot including an enlarged portion having a size sufficient to receive said head and a narrow portion connected to said enlarged portion, said second end of said connecting member being disposed within said narrow portion of said slot and the head being disposed behind said other section to connect said connecting member to said other section.

2. The vehicle ramp of claim 1, wherein said inclined section includes an inclined surface having a downwardly extending depression, said pivotal means being located within said depression and beneath the level of the inclined surface.

3. The vehicle ramp of claim 1, wherein said inclined section includes an inclined surface having a downwardly extending well therein and having an opening in said well, said connecting member extending through the opening in the well, and said connecting member including an abutment located at said first end and disposed on the upper side of said inclined surface, said abutment being located in the well beneath the level of said inclined surface.

4. A vehicle ramp, comprising a stand having an upper surface to support the wheel of a vehicle, an incline connected to said stand, said incline including an inclined surface having a downwardly extending well therein and having an opening in said well, a connecting member connecting the stand and the incline, a first end of said connecting member extending through the opening in said well, abutment means secured to said first end of the connecting member and located on the upper side of said inclined surface and disposed within said well, said connecting member being disposed to pivot vertically within said opening and said abutment means preventing withdrawal of said connecting member through said opening, said stand including a generally vertical leg having an aperture therein, the second end of said connecting member extending through said aperture, and second abutment means connected to the second end of the connecting member and located on the opposite side of said leg from said incline, engagement of said second abutment with said leg preventing withdrawal of said connecting member from said aperture.

5. The vehicle ramp of claim 4, wherein said aperture is generally keyhole-shaped including an enlarged upper portion and a narrow lower portion, said enlarged upper portion having a size sufficiently large to receive said second abutment means, whereby the second abutment means is inserted through said enlarged upper portion of the aperture and the connecting member is dropped downwardly within said narrow lower portion of said aperture.

6. The vehicle ramp of claim 4, wherein the first abutment means is located within the depression beneath the level of said incline surface.

7. The vehicle ramp of claim 4, wherein the opening in said incline surface is elongated in a direction longitudinal of said incline surface to permit vertical pivot movement of said connecting member with respect to said incline.

8. A vehicle ramp, comprising a stand including an upper supporting member to support the wheel of a vehicle and a pair of leg members joined to the ends of said support member, an incline connected to an end of said support member, connecting means for connecting each leg member to the support member, said connecting means comprising a tab on one of said members and a slot in the other of said members to receive the tab, a corner brace connecting the support member to the leg members at the corners of the stand, and second connecting means connecting the incline to the stand and including a second tab on said incline and a second slot in said stand to receive said second tab.

9. The vehicle ramp of claim 8, wherein said support member and each leg member are provided with a pair of side surfaces, the side surfaces of the support member being disposed in lapping relation with respect to the side surfaces of the respective leg member at the corners of the stand, and third connecting means connecting the lapping side surfaces together.

10. The vehicle ramp of claim 8, wherein said corner brace is provided with a pair of third tabs and each leg member is provided with a third slot and said support member is provided with a fourth slot, the third tabs of said corner brace being received within the third and fourth slots respectively to attach the corner brace to said support member and leg member.

* * * * *